United States Patent [19]
Ungerecht

[11] Patent Number: 5,823,580
[45] Date of Patent: Oct. 20, 1998

[54] TUBING CONNECTOR AND SPRINKLER COUPLING ASSEMBLY

[75] Inventor: Cliff Ungerecht, Walla Walla, Wash.

[73] Assignee: Nelson Irrigation Corporation, Walla Walla, Wash.

[21] Appl. No.: 742,910

[22] Filed: Nov. 1, 1996

[51] Int. Cl.$^6$ .................................................. F16L 33/22
[52] U.S. Cl. .................. 285/242; 239/276; 285/196; 285/239
[58] Field of Search .................. 285/242, 331, 285/239, 140.1, 196, 256, 259; 248/87, 219.2, 508; 239/271, 272, 276

[56] References Cited

U.S. PATENT DOCUMENTS

| | | | |
|---|---|---|---|
| 4,190,206 | 2/1980 | Atkinson et al. | 239/271 |
| 4,544,187 | 10/1985 | Smith | 285/256 |
| 4,577,894 | 3/1986 | Wake | 285/242 |
| 4,653,779 | 3/1987 | Foster | 285/256 |
| 4,703,957 | 11/1987 | Blenkush | 285/239 |
| 4,846,406 | 7/1989 | Christy | 239/276 X |
| 4,850,555 | 7/1989 | Lemkin et al. | 248/87 |
| 4,953,788 | 9/1990 | Hansen | 239/276 X |
| 5,052,722 | 10/1991 | Kubo et al. | 285/62 |
| 5,105,854 | 4/1992 | Cole et al. | 138/109 |
| 5,228,721 | 7/1993 | Whittle et al. | 285/23 |
| 5,265,652 | 11/1993 | Brunella | 141/59 |
| 5,387,016 | 2/1995 | Joseph et al. | 285/148.16 |
| 5,507,536 | 4/1996 | Oliveto, II et al. | 285/196 |

FOREIGN PATENT DOCUMENTS

| | | | |
|---|---|---|---|
| 74732 | 3/1949 | Norway | 285/239 |

OTHER PUBLICATIONS

Koleske et al. Poly(Vinyl Chloride). New York: Gordon and Breach Science Publishers. p. 98, 1969.

*Primary Examiner*—Anthony Knight
*Assistant Examiner*—Greg Binda
*Attorney, Agent, or Firm*—Nixon & Vanderhye P.C.

[57] ABSTRACT

A unitarily formed, one-piece connector includes an inner, open ended tubular insert portion, one end of which has a plurality of radially outwardly directed annular barbs on an exterior surface thereof. The one end is further provided with a radially outer sleeve, the sleeve having at least one continuous, radially inwardly directed annular barb formed on an interior surface thereof. The one end is adapted to receive one end of a length of flexible tubing between the sleeve and the tubular insert portion. A coupling assembly for supporting a sprinkler and for connecting the sprinkler to a supply conduit includes a coupling body having an axial through-bore, one end of the coupling body having a flexible tubing connector portion, and the other end of the coupling body having a screw thread formed thereon, adapted for connection to the sprinkler body. The flexible tubing connector portion includes an inner, open ended tubular insert portion, one end of which has a plurality of radially outwardly directed annular barbs on an exterior surface thereof. The one end is further provided with a radially outer sleeve, the sleeve having at least one continuous, radially inwardly directed annular barb formed on an interior surface thereof. The one end is adapted to receive one end of a length of flexible tubing of a first predetermined diameter between the sleeve and the tubular insert portion. The other end of the tubing is fitted with a connector and attached to a supply conduit.

17 Claims, 6 Drawing Sheets

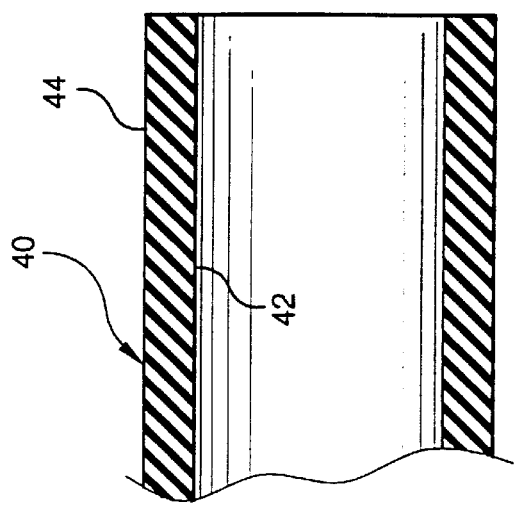
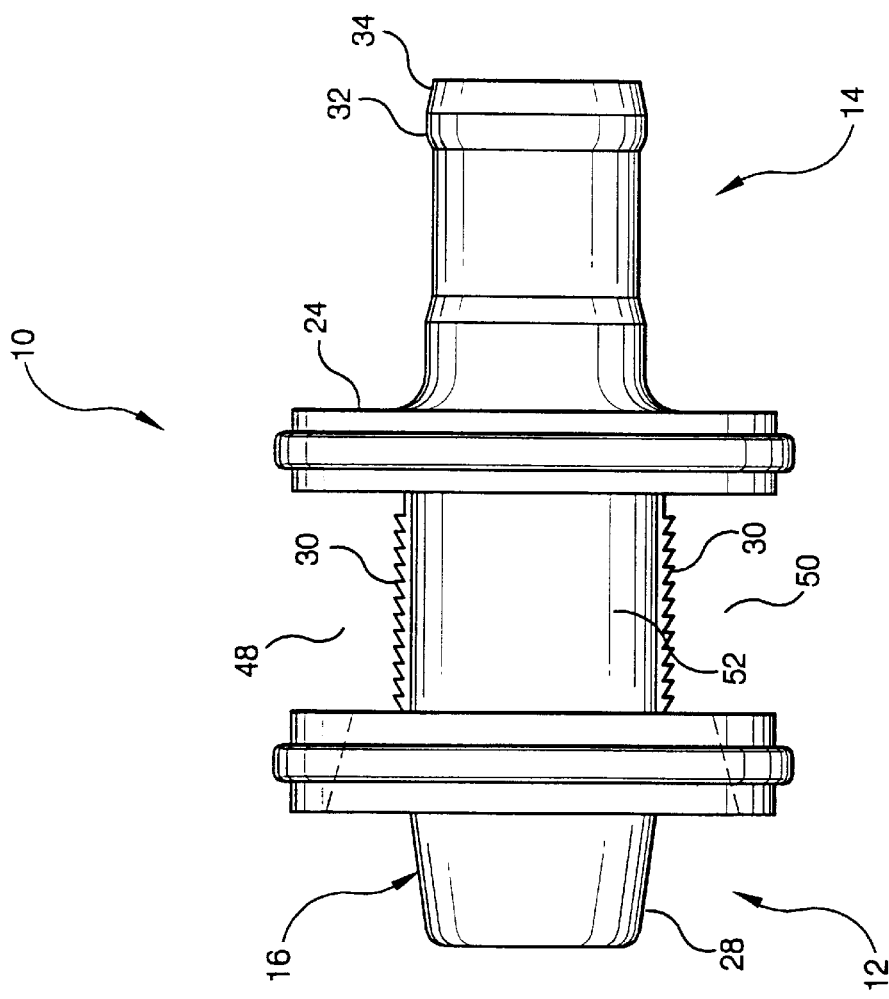

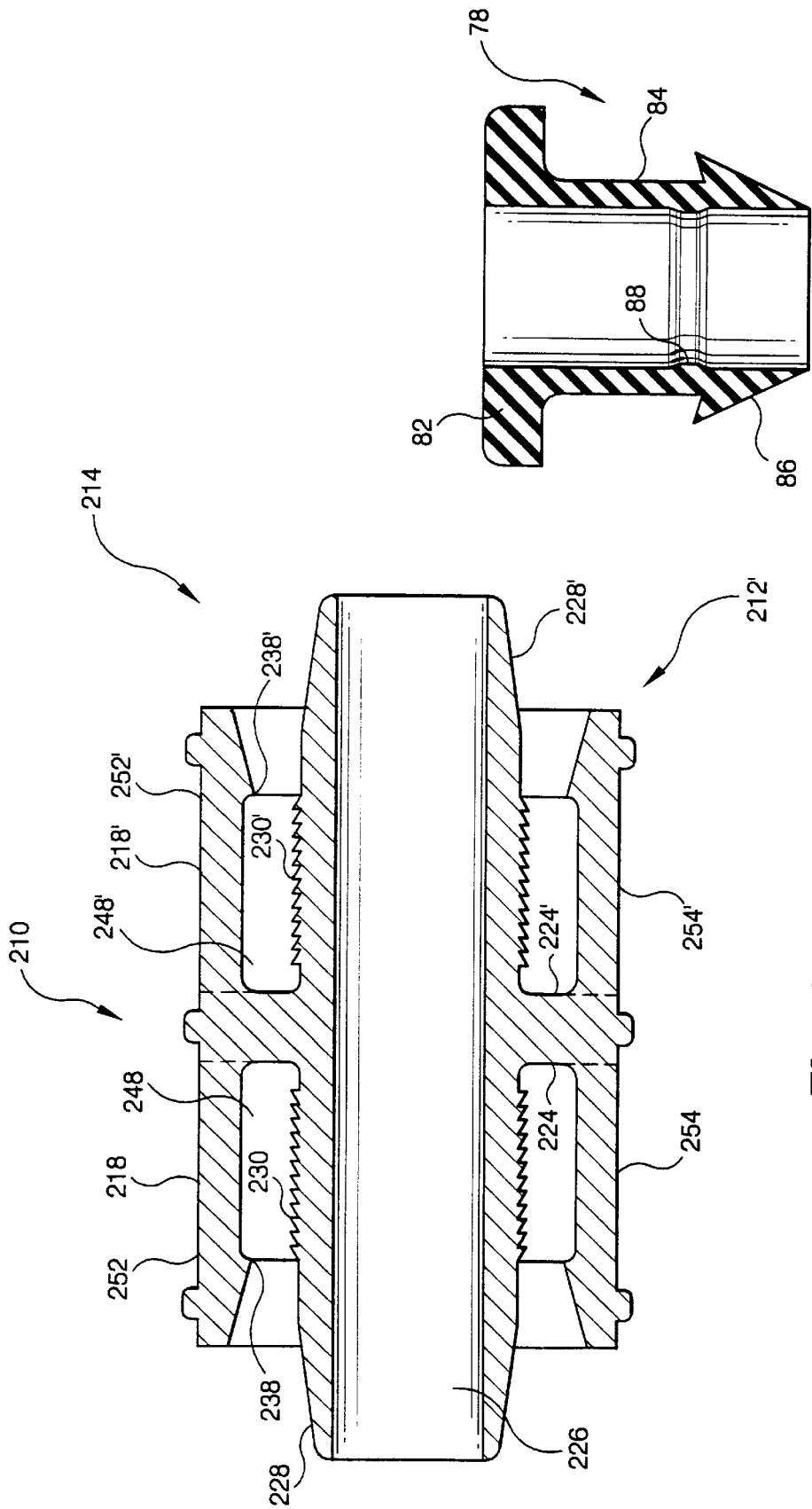

TUBING CONNECTOR AND SPRINKLER COUPLING ASSEMBLY

TECHNICAL FIELD

This invention relates to tubing connectors generally, and, more specifically, to a tubing connector with one end designed for use with flexible PVC tubing. The invention also relates to a sprinkler coupling assembly incorporating such a tubing connector.

BACKGROUND PRIOR ART

Flexible PVC tubing is well regarded for its "non-kinking" characteristics which, for many applications, make it a more desirable choice than, for example, polyethylene tubing. One of the negative aspects of flexible PVC tubing, however, is its tendency to creep and swell with pressure and elevated temperatures. Because of this swelling or expansion characteristic, flexible PVC tubing must be contained on its outside diameter by a clamping device or compression type fitting.

In order to manufacture a compression fitting, two parts are generally required. For example, U.S. Pat. No. 4,544,187 discloses a hose end fitting which includes a barbed insert portion and a ferrule body which can be swaged onto the insert, after the barbs have been formed on the insert. The outer sleeve or ferrule is then swaged inwardly into compressive engagement with the hose or tube end. Similar arrangements are disclosed in U.S. Pat. Nos. 4,653,779; 5,105,854; and 5,387,016. In U.S. Pat. No. 5,228,721, an additional crimp ring is utilized to force a radially outer sleeve or ferrule into compressive engagement with the hose or tube end. Still another two-piece flexible hose end connector is disclosed in U.S. Pat. No. 4,577,894.

One-piece hose end connectors are disclosed in U.S. Pat. Nos. 5,265,652 and 5,052,722. Here again, however, the outer sleeve portion of the connector must be deformed into compressive engagement with the hose or tube end and, in addition, because of the one-piece construction, the connector insert member in each case is smooth about its external surface due to the presence of the integral outer sleeve which precludes the forming of external barbs on the insert.

DISCLOSURE OF THE INVENTION

It is the principal objective of this invention, to provide a unitaxily formed, one-piece hose or tube end connector, especially designed for flexible PVC tubing, which includes a barbed inner tubular insert portion and a radially outer sleeve, but which does not require any further deformation steps in order to secure the connector to the hose or tube end, and which does not require any external crimping ring or the like.

In an exemplary embodiment of the invention, the connector is provided with an inner tubular insert portion having a tube connector end and a coupling end. At the tube connector end, which is the principal focus of this invention, the inner tubular insert portion is provided with a smooth tapered end surface which facilitates insertion of a length of flexible tubing. Downstream of the smooth surface, the inner member is provided on its exterior surface with a plurality of continuous circumferential barbs which are angled so as to facilitate axial movement of the tube end over the barbs, but which inhibit removal of the tube end from the connector. The integral outer sleeve is open at one end, and closed at an opposite end located approximately midway along the length of the tubular insert portion. This outer sleeve is also formed with an inclined guide surface at the insertion end thereof, the tapered surface terminating at an undercut which provides a radially inwardly facing continuous annular barb. The remainder of the sleeve is provided with a smooth axial surface.

To facilitate manufacture of the connector, and particularly to facilitate the formation of the barbs on the exterior of the inner tubular insert member, the radially outer sleeve is formed with a pair of windows which extend substantially about the circumference of the connector. In fact, the windows at opposite ends thereof are connected by a pair of relatively thin, axially extending webs. In this way, forming tools can be laterally reciprocated into and out of the windows to form the barbs about the full 360° exterior circumferential surface of the inner tubular insert member.

It will be appreciated that the annular radial space between the inner tubular insert member and the radially outer sleeve is designed to accept an end of a flexible PVC tube in such a way that the radially outwardly facing barbs on the inner tubular insert member will engage the internal surface of the tube. At the same time, there is a close fit between the tubing OD and the inner surface of the outer sleeve, with the single radially inwardly facing barb on the inside of the outer sleeve designed to bite into the outer surface of the flexible PVC tube during radial expansion of the tube under normal use conditions. With this arrangement, the connector is securely fitted to the tube end and the latter is unable to creep or otherwise back out of the connector under all anticipated pressure and/or temperature conditions.

The other or coupling end of the connector is provided with a conventional snap fit arrangement, with the outer surface of the inner tubular insert member having a substantially smooth construction with a slightly enlarged head at the free end thereof. This end of the connector is adapted to be snap fit into, for example, a relatively rigid supply conduit, adaptor or the like.

In an alternative embodiment, the coupling end of the connector is modified so that in place of the enlarged head at the free end thereof, there is formed a substantially arrowhead shaped barb for those applications where it is desired to have a more permanent coupling.

In a third exemplary embodiment of the invention, a double connector is provided where the above described tube connector configuration is formed at both ends of the connector, i.e., the coupling end described above is replaced by another tube connector end configuration facing in the opposite direction. This is particularly advantageous when the connector is used as a splicer, connecting two lengths of flexible tubing.

In still another exemplary embodiment, the tube connector end is incorporated within a sprinkler coupling assembly utilized to connect a length of flexible tubing between a fixed sprinkler support device and a water supply conduit. This adaptor is also configured to be supported on a stake or riser which enables the sprinkler to be supported above ground.

It is also a feature of the present invention to provide an adaptor which can be snap fit into a water supply conduit so that the coupling end of a hose end connector in accordance with this invention which is attached to the other end of the tube remote from the sprinkler coupling, can be readily attached or detached from the supply conduit. The adaptor is formed to include a radial flange and an axially extending tubular portion, terminating at a barbed end having a substantially arrowhead shape. When the adaptor is inserted into the conduit, the arrowhead shaped barb prevents the adaptor from subsequent removal. At the same time, the interior of the adaptor is configured to accept the conventional coupling end of the connector so that the latter can be easily attached or detached from the adaptor.

Accordingly, in one exemplary embodiment, the present invention provides a unitarily formed, one-piece connector comprising an inner, open ended tubular insert portion, one end of which has a plurality of radially outwardly directed annular barbs on an exterior surface thereof, the one end further provided with a radially outer sleeve, the sleeve having at least one continuous, radially inwardly directed annular barb formed on an interior surface thereof, the one end adapted to receive one end of a length of flexible tubing between the sleeve and the tubular insert portion.

In another aspect, the present invention relates to a coupling assembly for supporting a sprinkler and for connecting the sprinkler to a supply conduit, the assembly comprising a coupling body having an axial through-bore, one end of the coupling body having a flexible tubing connector portion, and the other end of the coupling body having a screw thread formed thereon, adapted for connection to the sprinkler body; the flexible tubing connector portion comprising an inner, open ended tubular insert portion, one end of which has a plurality of radially outwardly directed annular barbs on an exterior surface thereof, the one end further provided with a radially outer sleeve, the sleeve having at least one continuous, radially inwardly directed annular barb formed on an interior surface thereof, the one end adapted to receive one end of a length of flexible tubing of a first predetermined diameter between the sleeve and the tubular insert portion.

Other objects and advantages will become apparent from the detailed description which follows.

BRIEF DESCRIPTION OF THE DRAWINGS

FIG. 5 is a side elevation of the connector illustrated in FIG. 1, but rotated 90° about its longitudinal axis;

FIG. 6 is a cross section through a length of flexible tubing for use with the connectors in accordance with the invention;

FIG. 8 is a cross section of a connector in accordance with a third embodiment of the invention;

FIG. 12 is a cross section through an adaptor incorporated in the assembly shown in FIG. 9.

BEST MODE FOR CARRYING OUT THE INVENTION

Figure 2:
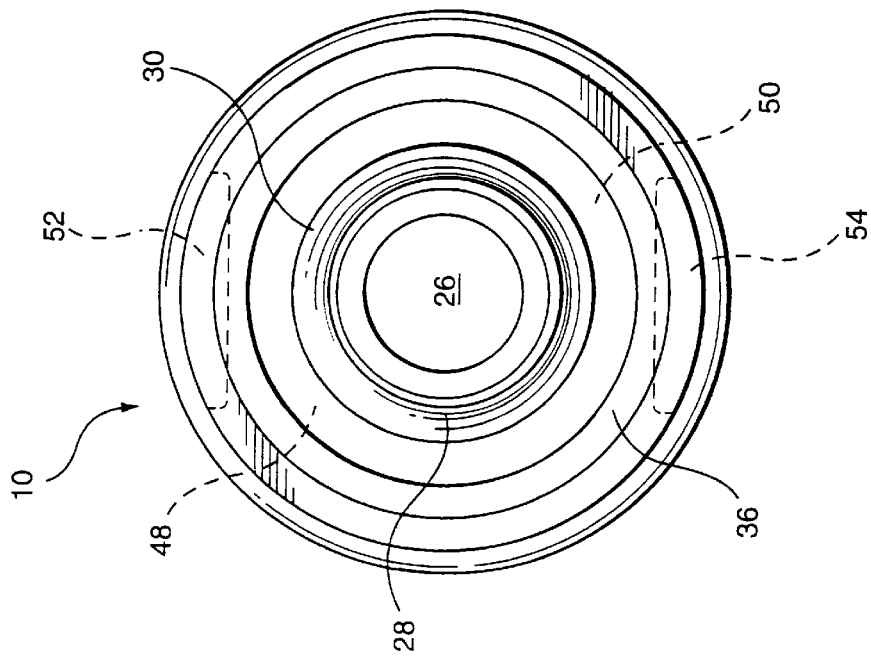
FIG. 2 is a left end elevation of the connector shown in FIG. 1.

With reference to FIGS. 1–5, the connector 10 in accordance with a first exemplary embodiment of the invention has a tube connector end 12 (i.e., that end adapted to connect to e.g., a flexible PVC tube) and a coupling end 14 (i.e., that end adapted to connect to a coupling, adaptor, pipe, conduit, etc.). The connector 10 is of one piece, molded plastic construction and includes an inner generally cylindrical, open ended tubular insert portion 16 and an axially shorter, radially outer sleeve portion 18, open at one end 20 and closed at its opposite end 22 where it joins to the inner tubular portion 16 by means of a radial flange 24. The latter joins to portion 16 approximately midway along the length of the connector.

The tubular insert portion 16 is formed with a hollow through-bore 26, which, in the coupling end 14, has a slightly reduced ID as compared to the through-bore in the tube connector end 12. The inner tubular insert portion 16 in the coupling end 14 is formed on its exterior surface with a smooth tapered end 28 and a circumferentially barbed section 30 extending axially substantially from the tapered end 28 to the radial flange 24. Reference numeral 30 is used here to designate the barbs individually and collectively.

The coupling end 14 has on its exterior and adjacent the free end thereof, an enlarged ring 32, with a tapered guide surface 34. This coupling end 14 of the connector 10 is of generally known construction, with the enlarged ring 32 adapted to be snapped into or out of another coupling, adaptor or the like, as described further below.

The radially outer sleeve 18 has an interior inlet edge 36 formed with a continuous circumferential taper, undercut to form a radially inwardly directed, circumferentially continuous barb 38 located axially adjacent the barbs 30. From the undercut, the sleeve 18 has a smooth ID axially extending to the flange 24.

The tube connector end 12 in accordance with this invention is designed especially for use with flexible PVC tubing, and engages both the inside and outside surfaces of the tubing. In use, one end of a length 40 of flexible PVC tubing as shown in FIG. 6, having an inner surface 42 and an outer surface 44, is pushed axially over the tapered end 28 of the tubular insert portion 16, and past the barb 38, and then along the barbed section 30, until the end of the tube abuts (or lies adjacent) the radial flange 24. Note that the barbs 30 are angled toward the radial flange 24, facilitating sliding movement of the tube end toward the flange 24, but inhibiting movement in the opposite direction under any reasonably anticipated axial force. At the same time, the outer surface 44 of the PVC tubing 40 is engaged continuously about its circumference by the annular barb 38. With this arrangement, the tube end is securely fastened to the connector, particularly in light of normal radial expansion of the flexible PVC tubing in use. In other words, under radial expansion, the barb 38 bites into the outer surface 44 of the tube end. With the compression thus exerted on the tube end sandwiched between sleeve 18 and inner tubular insert portion 16, the tube 40 is effectively precluded from "backing out" of the connector 10 under any foreseeable use conditions.

In one embodiment of a connector 10 and associated tube 40, where the connector 10 has an overall length of about 1.30 inches, the following relevant dimensions are exemplary:

tube OD: 0.505±0.005 inch
tube ID: 0.355 inch
tube thickness: 0.075±0.0025 inch
connector sleeve ID at edge of barb 38: 0.530 inch
connector sleeve ID at smooth base 46: 0.570 inch connector insert portion OD at bottom of teeth: 0.379 inch
connector insert portion OD at top of teeth: 0.410 inch The connector 10 as described above is less costly and easier to connect to a length of tubing because of its one-piece construction, i.e., it eliminates the need for any separate clamps or ties, and also because no additional deforming step is required with respect to the outer sleeve 18.

The connector 10 is also easy to manufacture, particularly with respect to the forming of barbed section 30. The latter is formed by a pair of laterally reciprocable dies, each engaging the insert portion 16 through 180°. This is made possible by forming a pair of windows 48 and 50 in the sleeve 18, each window extending circumferentially between diametrically opposed, axially extending webs 52, 54. The windows 48, 50 are sufficiently large to enable the barb forming dies (not shown) to form the barbs 30 about the full circumference of the tubular insert portion 16.

While the above described connector 10 is designed especially for use with flexible PVC tubing, it may also be used effectively with polyethylene or other tubing as well.

Figure 7:
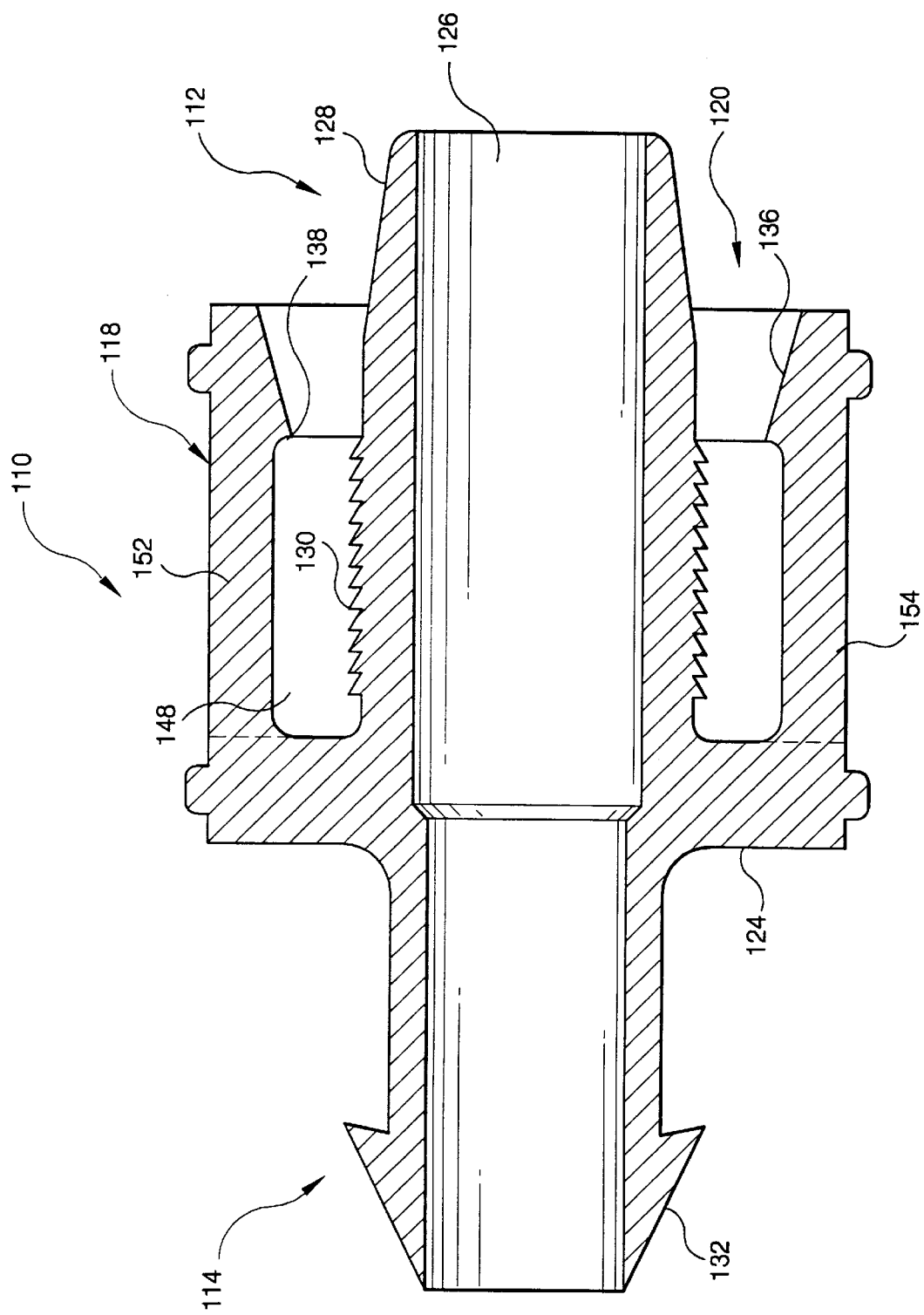
FIG. 7 is a cross section through a connector in accordance with an alternative embodiment of the invention.

Turning now to FIG. 7, a second exemplary embodiment of the connector in accordance with this invention is illustrated. For ease of understanding, reference numerals are used in FIG. 7 similar to those used to designate corresponding elements of the connector in FIG. 1, but with the prefix "1" added. Thus, the connector 110 has a tube connector end 112 which is substantially identical to the tube connector end 12 of the embodiment illustrated in FIG. 1. The coupling end 114, however, has been modified to incorporate an arrowhead shaped barb 132. With this arrangement, the connector 110 and its associated flexible tubing can be connected to, for example, a supply conduit by snapping the coupling end 114 into a suitably sized hole in the conduit such that the connector is more or less permanently secured to the conduit (or other component).

In FIG. 8, another connector 210 is illustrated in which the coupling end 14 has been eliminated in favor of another connector end 212' which is substantially identical to the connector end 212, but which faces in the opposite direction. This arrangement is particularly useful as a splicer connecting two lengths of flexible PVC (or other) tubing. Reference numerals used in FIG. 8 correspond to those used in FIG. 1 but with the prefix "2" added, and with a prime suffix added for corresponding elements in the connector end 212'.

Figure 10:
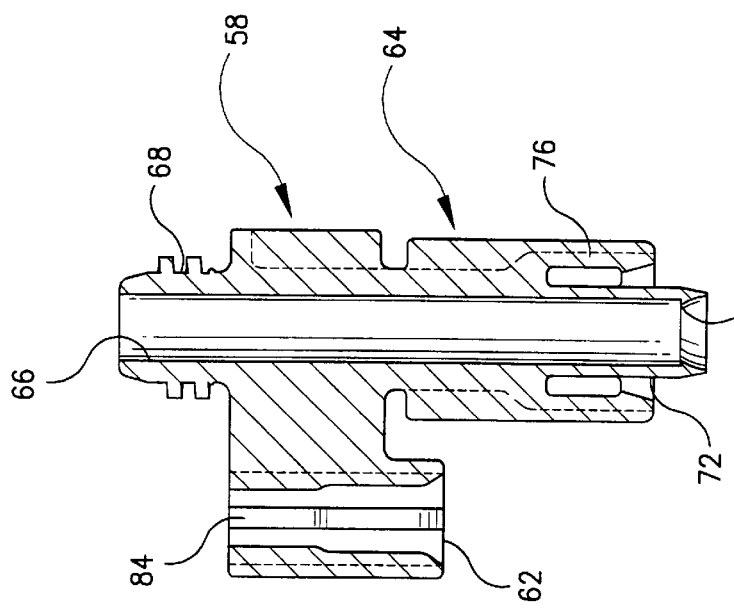
FIG. 10 is a cross section through the sprinkler coupling illustrated in FIG. 9.
Figure 11:
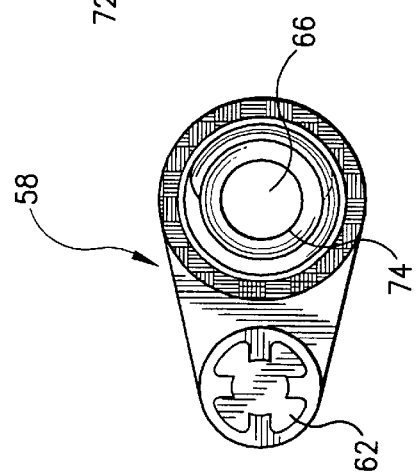
FIG. 11 is a top plan view of the sprinkler coupling illustrated in FIG. 9.
Figure 9:
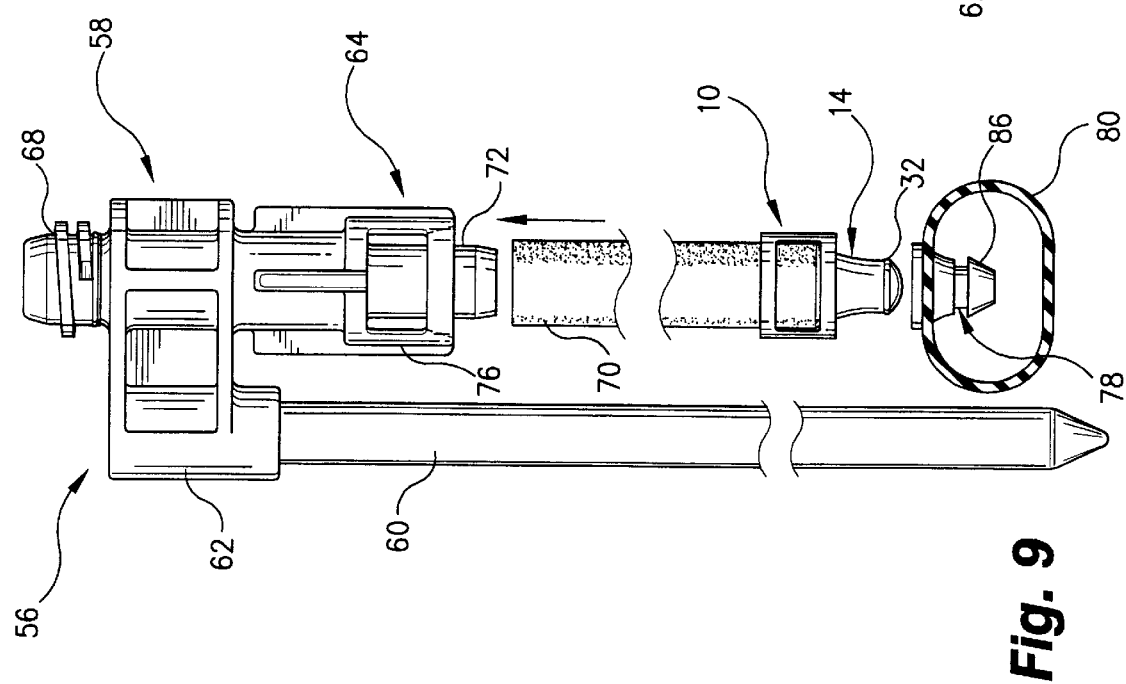
FIG. 9 is a partial side elevation of a sprinkler coupling incorporating a connector in accordance with the invention, and also illustrating a length of flexible tubing connected between the sprinkler coupling device and a water supply conduit.

Turning to FIGS. 9–11, a sprinkler coupling assembly 56 is shown which includes a one-piece coupling 58 is adapted to be supported on a riser or stake 60 which is driven into the ground at one end, and fitted into a socket 62 at its opposite end. The socket 62 lies adjacent and parallel to a tube connector end portion 64 which is substantially identical to the tube connector end portion 12 of the connector 10 shown in FIG. 1. The coupling through-bore 66 (FIG. 10) extends from the connector end 64 axially upwardly through a threaded upper end 68 which is adapted to receive a threaded female end of a sprinkler body (not shown).

The manner in which the connector end portion 64 accepts one end of a length of flexible PVC tubing 70 is as described previously in connection with FIGS. 1–6. This particular application of the invention has one additional feature however. With specific reference to FIG. 10, the inside surface of the inner tubular insert portion 72 is formed on its interior surface with a continuous annular barb 74. This arrangement allows two alternative sizes of flexible tubing to be used at the connector end portion 64. In other words, a larger size tube, i.e., tube 70, may be fitted over the inner tubular portion 72 and inside the outer sleeve 76 in the manner previously described. Alternatively, however, a smaller diameter length of flexible tubing (not shown) may be pushed upwardly into the inner tubular insert portion 72, with the annular barb 74 preventing separation under anticipated fluid pressures and/or external axial forces.

Figure 1:
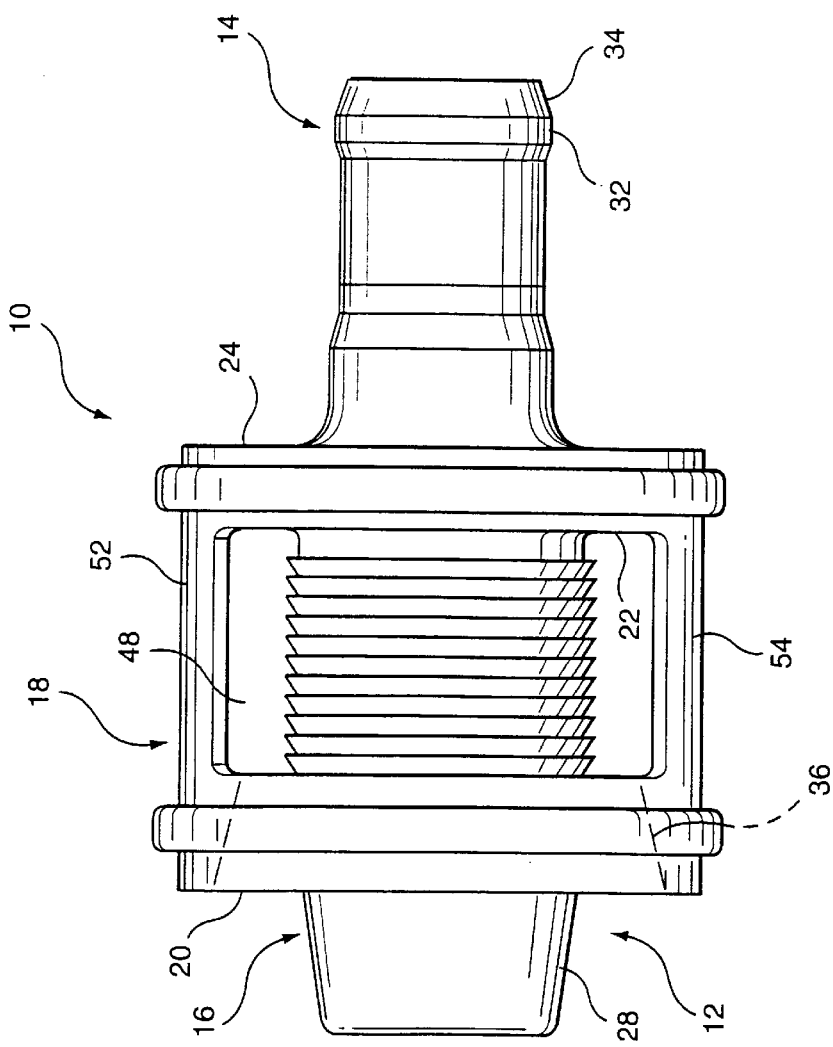
FIG. 1 is a side elevation of a connector in accordance with a first embodiment of the invention.
Figure 4:
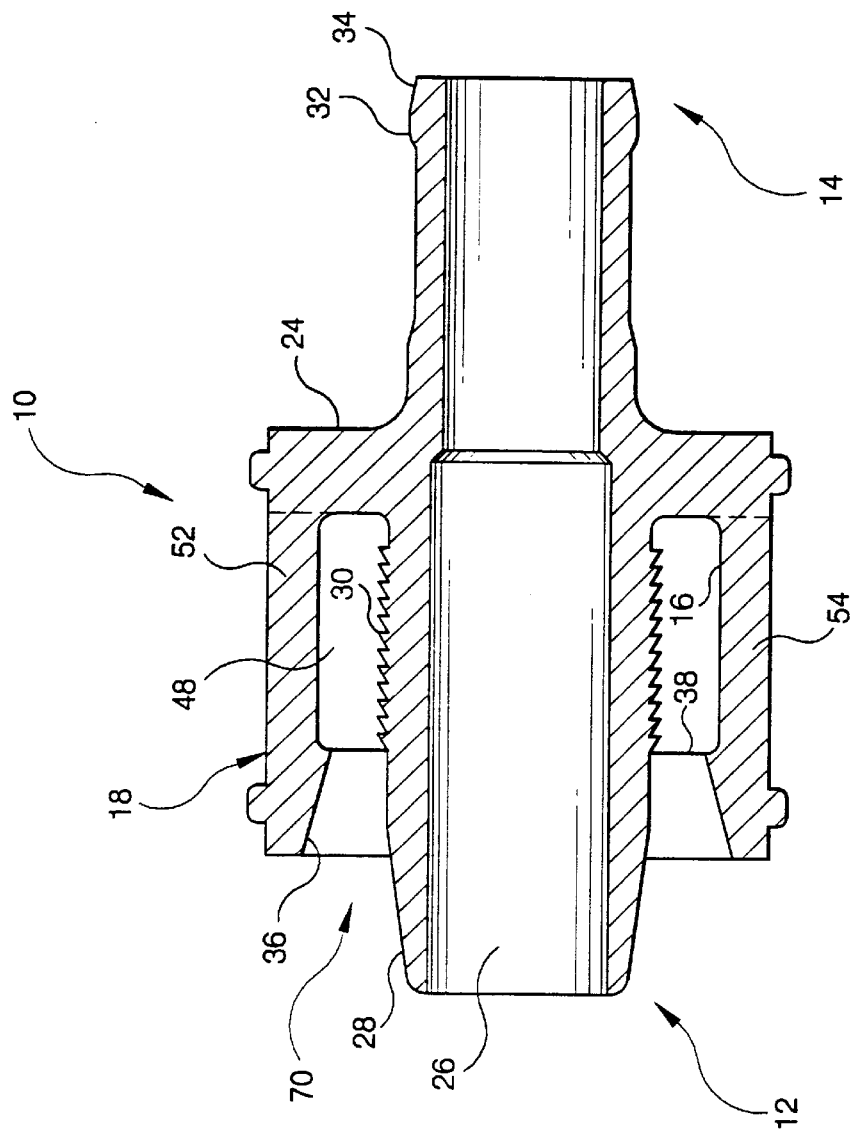
FIG. 4 is a cross section of the connector illustrated in FIG. 1.
Figure 3:
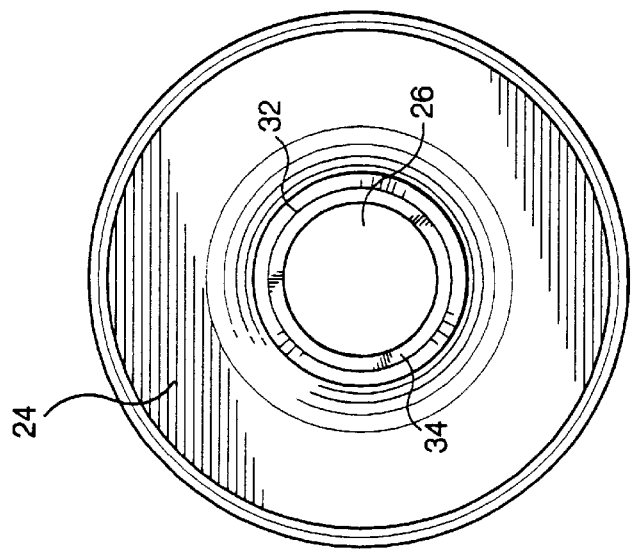
FIG. 3 is a right end elevation of a connector shown in FIG. 1.

Another feature of the invention is shown in FIGS. 9 and 12. Here, the opposite end of flexible tube 70 is fitted with a connector 10 as shown in FIG. 1, including a conventional coupling end portion 14. The latter may be utilized in conjunction with an adaptor 78 (FIG. 12) secured to a length of relatively stiff polyethylene tubing or other plastic water supply conduit 80. The adaptor 78 includes a radial flange 82 and a tubular extension 84 terminating at an arrow-shaped, annular barb 86. The adaptor may be snapped into a hole in the tube 80 as best seen in FIG. 9, and the coupling end 14 of the connector 10 may be snapped into the adaptor 78, with the enlarged head 32 passing beyond an internal annular rib 88 in the adaptor. With this arrangement, the tube 70 and connector 10 may be easily connected and disconnected from the water supply conduit 80.

Variations in the above described components are within the scope of this invention. For example, for those applications where it is described to have a more or less permanent connection between the coupling end 14 and the tube 80, the adaptor 78 can be omitted, and a connector 110 can be attached to the tube 70. The arrow-shaped barb at 132 will serve to more or less permanently secure the connector 110 to the conduit 80.

In addition, the socket 62 of the coupling 58 may be provided with internal "tabs" or flaps 82 which allow a riser having an OD corresponding to the opening defined by the tabs 82 to be press fit within the socket. The bore of the socket is provided with a secondary diameter by means of angled ribs 84 (FIG. 10) located approximately midway along the bore to allow a riser having an OD corresponding to the smaller opening defined by ribs to be press fit into the socket.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A unitarily formed, one-piece connector comprising an inner, open ended tubular insert portion, one end of which has a plurality of radially outwardly directed annular barbs on an exterior surface thereof, said one end further provided with a radially outer sleeve, said insert portion extending axially beyond said radially outer sleeve, said sleeve having a single continuous, radially inwardly directed annular barb formed on an interior surface at a free end thereof, said radially inwardly directed annular barb located axially adjacent said plurality of radially outwardly directed annular barbs, said one end adapted to receive one end of a length of flexible tubing between said sleeve and said tubular insert portion in a direction such that said length of flexible tubing first engages said single radially inwardly directed barb before engaging said plurality of radially outwardly directed barbs.

2. The connector of claim 1 wherein an opposite coupling end of said tubular insert portion is formed with an enlarged head adapted for detachable snap fit engagement with a cooperating component.

3. The connector of claim 1 wherein an opposite coupling end of said tubular insert portion is formed with an arrowhead-shaped barb adapted for substantially permanent snap fit engagement with a cooperating component.

4. The connector of claim 1 wherein an opposite end of said tubular insert portion is substantially identical to said one end.

5. The connector of claim 1 in combination with a length of flexible PVC tubing secured to said one end.

6. A unitarily formed, one-piece connector comprising an inner, open ended tubular insert portion, one end of which has a plurality of radially outwardly directed annular barbs on an exterior surface thereof, said one end further provided with a radially outer sleeve, said sleeve having at least one continuous, radially inwardly directed annular barb formed on an interior surface at a free end thereof, said radially inwardly directed annular barb located axially adjacent said plurality of radially outwardly directed annular barbs, said one end adapted to receive one end of a length of flexible tubing between said sleeve and said tubular insert portion; wherein said sleeve is formed with a pair of circumferentially spaced windows, located radially adjacent said plurality of radially outwardly directed annular barbs, and adapted to permit access to said tubular insert portion by a pair of barb forming tools.

7. The connector of claim 6 wherein said pair of windows are sized to permit 360° access to said tubular insert portion.

8. A coupling assembly for supporting a sprinkler and for connecting the sprinkler to a supply conduit, the assembly comprising:

a coupling body having an axial through-bore, one end of said end of said coupling body having a flexible tubing connector portion, and the other end of said coupling body having a screw thread formed thereon, adapted for connection to the sprinkler body; said flexible tubing connector portion comprising an inner, open ended tubular insert portion, one end of which has a plurality of radially outwardly directed annular barbs on an exterior surface thereof, said one end further provided with a radially outer sleeve, said sleeve having a single continuous, radially inwardly directed annular barb formed on an interior surface at a free end thereof, said radially inwardly directed barb located axially adjacent said plurality of radially outwardly directed barbs, said one end adapted to receive one end of a length of flexible tubing of a first predetermined diameter between said sleeve and said tubular insert portion in a direction such that said length of flexible tubing first engages said single radially inwardly directed barb before engaging said plurality of radially outwardly directed barbs.

9. The assembly of claim 8 and further compressing a riser and wherein said coupling body is provided with a recess for receiving one end of said riser, the other end of said riser adapted to be driven into the ground.

10. The assembly of claim 8 wherein said assembly includes a length of flexible tubing, one end of which is secured to said flexible tubing connector on said coupling body.

11. The assembly of claim 10 wherein the other end of the length of flexible tubing is secured to a discrete connector comprising an inner, open ended tubular insert portion, one end of which has a plurality of radially outwardly directed annular barbs on an exterior surface thereof, said one end further provided with a radially outer sleeve, said sleeve having at least one continuous, radially inwardly directed annular barb formed on an interior surface thereof, said other end of said length of flexible tubing inserted between said sleeve and said tubular insert portion of said discrete connector.

12. The assembly of claim 11 wherein an opposite coupling end of said discrete connector is secured to a supply conduit by means of an adaptor secured within a hole formed in said supply conduit.

13. The assembly of claim 12 wherein said adaptor comprises a substantially cylindrical tubular body having a radial flange at one end thereof, and a substantially arrowhead-shaped barb at the other end thereof, said tubular body having a bore adapted to receive said coupling end of said discrete connector.

14. The assembly of claim 13 wherein said bore in said tubular body of said adapter is formed with an internal annular rib substantially radially adjacent said arrowhead-shaped barb.

15. The assembly of claim 10 wherein said flexible tubing comprises flexible PVC tubing.

16. The assembly of claim 8 wherein said tubular insert portion of said flexible tubing connector portion is formed with a continuous annular barb on an interior surface thereof, thereby permitting alternative insertion of a length of flexible tubing of a second predetermined diameter smaller than said first predetermined diameter within said tubular insert portion.

17. A unitarily formed, one-piece connector comprising an inner, open ended tubular insert portion, one end of which has at least one radially outwardly directed annular barb on an exterior surface thereof, said one end further provided with a radially outer sleeve, said insert portion extending axially beyond said sleeve, said sleeve having at least one continuous, radially inwardly directed annular barb formed on an interior surface at a free end thereof axially adjacent said at least one radially outwardly directed barb, said one end adapted to receive one end of a length of flexible tubing between said sleeve and said tubular insert portion in a direction such that said length of flexible tubing first engages said radially inwardly directed annular barb before engaging said radially outwardly directed barb; and wherein said sleeve is formed with a pair of circumferentially spaced windows, located radially adjacent said at least one outwardly directed annular barb, and adapted to permit access to said tubular insert portion by a pair of barb forming tools.

* * * * *